United States Patent [19]

Klauke

[11] 3,916,007
[45] Oct. 28, 1975

[54] BENZONITRILES WITH FLUORINATED SIDE CHAINS AND THE PREPARATION THEREOF

[75] Inventor: Erich Klauke, Odenthal-Hahnenberg, Germany

[73] Assignee: Bayer Aktiengesellschaft, Leverkusen, Germany

[22] Filed: Mar. 5, 1973

[21] Appl. No.: 338,007

[30] Foreign Application Priority Data
Mar. 23, 1972  Germany............................ 2214061

[52] U.S. Cl. ......... 260/465 G; 71/105; 260/248 NS
[51] Int. Cl.²....................................... C07C 121/52
[58] Field of Search................. 260/465 G; 269/694

[56] References Cited
UNITED STATES PATENTS
2,853,524  9/1958  Miller et al. .................... 260/694 X
3,012,058  12/1961  Hauptschein ...................... 260/465
3,489,784  1/1970  Fellig et al. .......................... 260/465

OTHER PUBLICATIONS
Groggins: Unit Processes in Org. Syn., 3rd ed., McGraw–Hill Book Co., p. 173 (1947).
Elslager et al.: J. Med. Chem., Vol. 13, No. 3, pp. 542–544 (1970).

*Primary Examiner*—Lewis Gotts
*Assistant Examiner*—Dolph H. Torrence
*Attorney, Agent, or Firm*—Burgess, Dinklage & Sprung

[57] ABSTRACT

Compounds having the formulae:

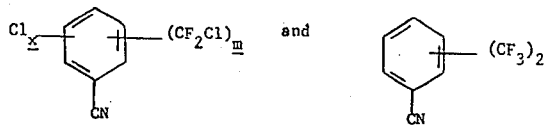

wherein
$x$ is 0 or 1, and
$m$ is 1 or 2,
are fluorinated in the side chain by reacting compounds having the formula:

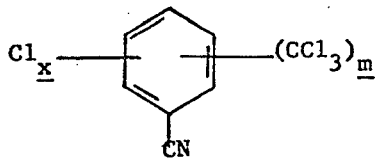

wherein
$m$ is 1 or 2, and
$x$ is 0 or 1,
with anhydrous hydroflouric acid at temperatures of from −10° to 200°C.

6 Claims, No Drawings

BENZONITRILES WITH FLUORINATED SIDE CHAINS AND THE PREPARATION THEREOF

BACKGROUND

This invention relates to a process for the production of side-chain-fluorinated benzonitriles.

Of the number of side-chain-fluorinated benzonitriles, only a few representatives have hitherto become known. With one exception, they are all prepared from the corresponding aminobenzotrifluorides by Sandmeyer's reaction with copper (I) cyanide (Anal. Chim. Acta 10, 34 (1954), Am. Soc. 73, 906 (1951)). In the case of 2-trifluoromethyl benzonitrile, another method of preparation has been described (Z. obsc. chim. 23, 988, 1953). It starts with 2-trichloromethyl benzonitrile which is fluorinated with antimony (III) fluoride. The process normally used for producing trifluoromethyl side chains on aromatic compounds on an industrial scale is based on a chlorine-fluorine exchange in and with anhydrous hydrofluoric acid (Houben Weyl, 4th Edition, 1962, Vol. V/3, page 110). On page 121 (loc. cit) and in Ang. Chem. 52, 459 (1939), however, it is specifically pointed out that trichloromethyl benzonitriles cannot be fluorinated with hydrofluoric acid.

SUMMARY

A process for the production of benzonitriles fluorinated in the side chain has now, surprisingly, been found, being distinguished by the fact that compounds corresponding to the general formula (I):

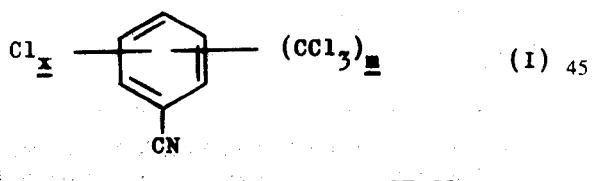

in which:
$m = 1$ or 2, and
$x = 0$ or 1,
are reacted with anhydrous hydrofluoric acid at a temperature in the range $-10°$ to $200°C$. The benzonitriles perfluorinated in the side chain are optionally prepared in two stages, the benzonitriles being optionally partially fluorinated in the side chain in the first stage and subsequently fluorinated, following intermediate isolation, with at least the stoichiometrically necessary quantity of antimony (III) fluoride at a temperature of up to $200°C$.

The compounds obtainable by the process according to the invention correspond to the general formula (II):

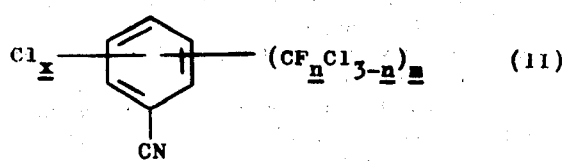

in which:
$m$ and $x$ are as defined above, whilst
$n = 1, 2$ or 3.

The compounds corresponding to the general formula (III):

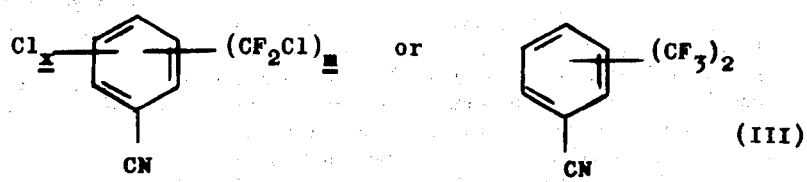

in which:
$x = 0$ or 1 and
$m = 1$ or 2,
are new.

DESCRIPTION

The following formulae represent preferred new compounds:

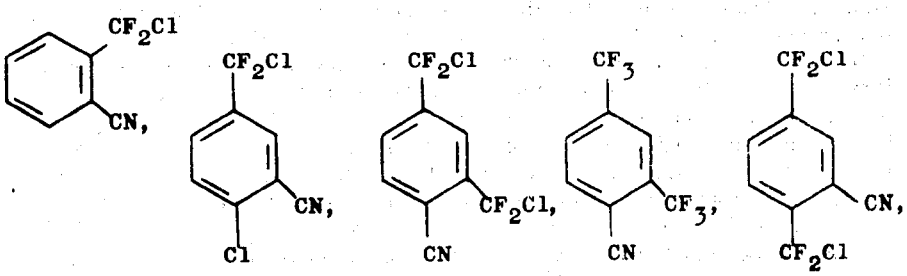

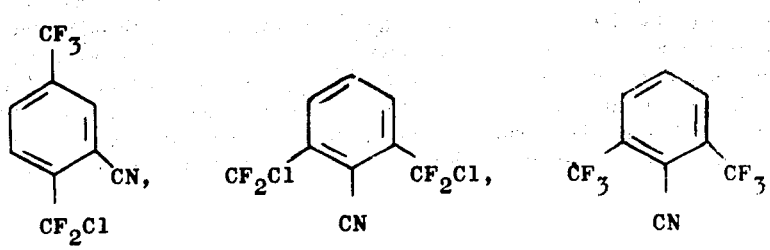

It must be regarded as particularly surprising that a chlorine/fluorine exchange can readily be carried out with anhydrous hydrofluoric acid in the case of benzonitriles containing 1 or 2 trichloromethyl groups. This exchange can be both partial and also complete.

The degree of fluorination is governed by the type, number and positions, relative to one another, of the substituents. It can be influenced by the reaction temperature and by catalysts. Antimony (V) chloride is normally used as the catalyst, in a quantity of from 0.5 to 5% by weight and preferably in a quantity of from 1 to 2% by weight.

It is readily possible to determine through preliminary tests, whether in special cases it is advisable to increase the pressure and temperature during the reaction in order to accelerate or to complete fluorination, or to obtain the same effect by the addition of a catalyst. It can also be of advantage in some cases to continue fluorination in hydrofluoric acid to only a certain degree of fluorination (in most cases up to the —$CF_2Cl$-stage) by applying milder conditions and, following intermediate isolation, to exchange the remaining chlorine atoms for fluorine in a second stage with at least the stoichiometrically necessary quantity (at a temperature of from 20° to 200°, preferably from 60° to 180°C) of antimony (III) fluoride. It is possible in this way to increase the total yield because secondary reactions can be more effectively avoided in this way. Secondary reactions which can reduce the yield of fluorinated benzonitrile affect the nitrile group. It is generally known that aromatic nitriles trimerise into triazines under the effect of sulphuric acid or chlorosulphonic acid. In the case of m- and p-trichloromethyl benzonitrile, trimerisation also occurs under fluorinating conditions. In addition to the fluorinated monomeric benzonitriles, the hitherto unknown side-chain-fluorinated tris(aryl)-triazines, which can readily be isolated, are also obtained in cases such as these. By adding alkali fluoride (preferably sodium or potassium fluoride) to the reaction solution, the ratio of monomeric fluorinated nitrile to the trimerisation product can be displaced towards a higher yield of monomeric nitrile.

The side-chain-chlorinated benzonitriles used as starting compounds are known in the majority of cases. So far as the unknown compounds are concerned, their preparation is described in the Examples.

The fluorinating reaction is readily carried out by introducing the side-chain-chlorinated benzonitrile, generally in substance alone rather than in solution etc., into an autoclave at a temperature in the range 0° to 10°C, adding a catalyst and/or an alkali metal fluoride if necessary, and then running in the anhydrous hydrofluoric acid. The reaction, whose beginning is reflected in the evolution of hydrogen chloride, is generally relatively slight at room temperature. The autoclave is then closed and a protective layer of nitrogen at a pressure of 1 to 3 atms. is applied. The autoclave is then heated until a vigorous reaction (indicated by an increase in pressure) begins (generally in the range 60° to 90°C). The hydrogen chloride formed is run off through a reflux condenser with a relief valve. The pressure is always released at a level which is distinctly above the vapour pressure of the pure hydrolfuoric acid at the corresponding temperature. On completion of the reaction, the autoclave is cooled, vented and the unused hydrofluoric acid distilled off. The residue, consisting of fluorinated nitriles, is purified by distillation.

The nitriles obtainable by the process according to the invention can be used as herbicides and also as intermediate products for plant protection agents (DOS 2,009,497). Their herbicidal activity is illustrated in the following example:

Pre-emergence test

Solvent: 5 parts by weight of acetone.
Emulsifier: 1 part by weight of alkylaryl polyglycol ether.

To prepare a suitable active-substance preparation, 1 part by weight of the active substance is mixed with the specified quantity of solvent, the specified quantity of emulsifier is added and the concentrate is diluted with water to the required concentration.

Seeds of the test plants are sown in normal soil and, after 24 hours, are watered with the active-substance preparation. The quantity of water applied per unit urea is best kept constant. The concentration of active substance in the preparation is unimportant, the only important factor being the quantity of active substance applied per unit area. After 3 weeks, the degree of damage to the test plants is assessed and characterised by the marks 0 to 5 which have the following meaning:

0 = no damage
1 = slight damage or growth retarded
2 = distinct damage or growth inhibited
3 = serious damage and defective development or only 50% emergence
4 = plants partly destroyed or showing only 25% emergence after germination
5 = plants completely destroyed or not emerging at all.

The active substances, the quantities in which they are applied and the results are set out in Table (I):

Table (I)

| Compound | Quantity of active substance applied in kg/ha | Chenopodium | Echinochloa | Sinapis |
| --- | --- | --- | --- | --- |
| 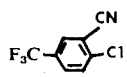 | 40 | 4 | 4 | 4 |

The other new compounds obtainable by the process according to the invention also show comparable herbicidal activity.

The new compounds are also active against Pellicularia sasakii.

Pellicularia test

| Solvent: | 1.9 parts by weight of dimethylformamide |
| --- | --- |
| Dispersant: | 0.1 part by weight of alkylaryl polyglycol ether |
| Water: | 98 parts by weight of water. |

The quantity of active substance required for the desired concentration of active substance in the spraying liquid is mixed with the specified quantity of solvent and the dispersant, and the concentrate is diluted with the specified quantity of water.

One group of 2 × 30 rice plants about 2 to 4 weeks old is sprayed until dripping wet with the spraying liquid. The plants are left to dry in a greenhouse at a temperature in the range 22° to 24°C in about 70% relative humidity. Thereafter, this group and a second (control) group of 30 are infected with a culture of Pellicularia sasakii, grown on malt agar, and left standing at 28° to 30°C/100% relative humidity.

The attack by Pellicularia sasakii is determined from the leaf damage after 5 to 8 days by comparison with the untreated but infected control. 0% means no attack, 100% means that the degree of attack is as high as it is in the control plants.

The active substances, active substance concentrations and results are set out in the following Table (II):

Table (II)

| Pellicularia test<br>Active substance | Attack as % of the attack of the untreated control for an active substance concentration (in %) of 0.025 |
| --- | --- |
| 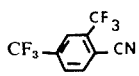 | 25 |
| inoculated control | 100 |

EXAMPLE 1

900 g of 2-trichloromethyl benzonitrile are introduced at 5°C into a 2 litre autoclave, of fine steel, equipped with a stirring mechanism, reflux condenser, thermometer and pressure relief valve, and 650 ml or anhydrous hydrofluoric acid are run in. Without waiting for the moderate evolution of hydrogen chloride to end, the autoclave is closed, and nitrogen at a pressure of 2 atms. is applied, followed by vigorous heating to 80°C. The internal pressure in the autoclave increases through the evolution of hydrogen chloride. By venting the autoclave, this internal pressure is kept at around 10 atms. After the main reaction has abated, the contents of the autoclave are heated for 1 hour to 100°C, the relief pressure being adjusted to 13 atms. The autoclave is then cooled, vented and the excess hydrofluoric acid is distilled off in vacuo. The residue is subjected to coarse distillation. 626 g of a water-clear liquid of $n_D^{20}$: 1 4870 are obtained According to a gas chromatogram, this liquid contains two main compounds in the ratio 2 to 3. Fractional distillation gives 2 trifluoro methyl benzonitrile of b.p. 91° – 92° C/15 Torr, $n_D^{20}$: 1.4650, and the greater proportion of 2-difluorochloromethyl benzonitrile of b.p. 113° – 114°C/13 Torr, $n_D^{20}$: 1,5029.

EXAMPLE 2 a. 1 mole = 220.5 g of 4-trichloromethyl benzonitrile, 47 g of potassium fluoride and 150 ml of hydrofluoric acid are introduced at 10° to 15°C into a 500 ml capacity fine-steel autoclave equipped with a stirring mechanism, reflux condenser and pressure-relief valve. No reaction occurs at the aforementioned temperature. The autoclave is then closed, a protective layer of nitrogen at a pressure of 1 atm. applied and the reaction mixture heated to 90°C with stirring. The increase in pressure caused by the evolution of hydrogen chloride is very slight. The pressure is released at 9 atms. After 2 hours, the autoclave is cooled, vented and the excess hydrofluoric acid distilled off in vacuo at 20°C. The residue is extracted with 2 × 100 ml of methylene chloride and distilled. 4-fluorodichloromethyl benzonitrile of b.p. 130°C/14 Torr, $n_D^{20}$: 1.5390, is obtained in a yield of 66 g (32% of the theoretical). The extraction residue is recrystallized once from gasoline: 104 g m.p.: 240°–243°C. According to mass spectroscopy, the substance shows a mol peak at 609 and is 1,3,5-tris-(4-fluorodichloromethyl phenyl)-triazine.

b. If 220.5 g of 4-trichloromethyl benzonitrile are reacted for 10 hours at up to 20°C with 150 ml of hydrofluoric acid (i.e., without the addition of potassium fluoride), the following is obtained after distillation:

142 g of a fraction of b.p. 112° – 140°C/12 Torr, $n_D^{20}$: 1.5445 which, according to a gas chromatogram, contains 75% of fluorodichloromethyl benzonitrile in addition to 18% of unchanged starting material and 3% of 4-difluorochloromethyl benzonitrile. This corresponds to a yield of approximately 70% of the theoretical. At the same time, only 38 g of residue of 1,3,5-tris-(4-fluorodichloromethyl phenyl)-triazine are obtained.

c. The meta-compound reacts more quickly during the chlorine/fluorine-exchange and gives even less residue (trimerisate). With the same starting quantities as above, 3-trichloromethyl benzonitrile gives over a period of 6 hours:

168 g of distillate of b.p. 118° – 138°C/15 Torr, $n_D^{20}$: 1.5400.

| Gas chromatogram: | 4 % of 3-difluorochloromethyl benzonitrile,<br>81 % of 3-fluorodichloromethyl benzonitrile,<br>13 % of unchanged starting material |
| --- | --- |
| Physical data:<br> | b.p. 98°C/11 Torr, $n_D^{20}$: 1.4956 |
|  | b.p. 122°C/11 Torr, $n_D^{20}$: 1.5355 |

EXAMPLE 3

1010 g of 4-trichloromethyl benzonitrile are introduced into an apparatus of the kind described in Example 1, followed by the addition of 600 ml of hydrofluoric acid. The evolution of hydrogen chloride begins at as low a temperature as 10° to 20°C. The mixture is then allowed to react under a relief pressure of 12 to 13 atms. at temperatures of up to 100°C. A solid residue with liquid fractions is obtained after cooling, venting and removal of the hydrofluoric acid by distillation. The liquid fractions are extracted with washing spirit and subjected to fractional distillation, giving:

10 g of 4-trifluoromethyl benzonitrile of b.p.: 183˘ – 185°C/Torr, m.p. 35° – 36°C 91 g of 4-difluorochloromethyl benzonitrile of b.p.: 105° – 106°C/18 Torr, $n_D^{20}$: 1.4972

The residue is the trimeric nitrile, 1,3,5-tris-(4-difluorochloromethylphenyl)-triazine and, after recrystallisation from gasoline, has a melting point of 258° – 260°C.

Both the monomeric 4-difluorochloromethyl benzonitrile and also the trimeric nitrile can be subsequently fluorinated with antimony (III) fluoride into the corresponding trifluoromethyl compound. Equimolar quantities of antimony (III) fluoride are used and fluorination is carried out at temperatures of up to 150°C. The trimeric 4-trifluoromethyl benzonitrile - 1,3,5-tris-(4-trifluoromethyl phenyl)-triazine and has a melting point of 268° to 269°C.

EXAMPLE 4

2000 g of 2-chloro-5-trichloromethyl benzonitrile are fluorinated in 1200 ml of hydrofluoric acid at 80° to 140°C under a pressure of approximately 18 atms. After cooling, the pressure is released, the excess hydrofluoric acid distilled off and the residue worked up by distillation. 2-chloro-5-trifluoromethyl benzonitrile of b.p.: 97°/14 Torr, m.p. 35° – 37°C, is obtained in a yield of 1108 g (69% of the theoretical), together with 315 g of last runnings of a partly fluorinated compound.

The 2-chloro-5-trichloromethyl benzonitrile used for the process was obtained as follows:

450 g of 2,5-dimethyl benzonitrile are initially introduced into a three-necked flask with an inlet pipe for chlorine, and chlorinated under ultraviolet irradiation at a temperature slowly increasing from 100° to 200°C, until no more chlorine is absorbed. The reaction product is then worked up by distillation. After some first runnings, 2,5-bis-(trichloromethyl)-benzonitrile of b.p. 195° – 200°C/12 Torr, m.p. 112° – 113°C, distills over in a yield of 1080 g (87.5% of the theoretical).

776 g of 2,5-bis-(trichloromethyl)-benzonitrile are treated with chlorine under ultraviolet irradiation at a temperature rising from 200° to 260°C (1 to 1.5 hours). Carbon tetrachloride is continuously distilled off. After the elimination of carbon tetrachloride is over, the product is worked up by distillation.

2-chloro-5-trichloromethyl benzonitrile of b.p. 171° – 172°C/12 Torr, m.p. 66° – 68°C is obtained in a yield of 458 g (78%).

EXAMPLE 5 a. 490 g of 2,4-bis-(trichloromethyl)-benzonitrile and 550 ml of anhydrous hydrofluoric acid are introduced at 15°C into a fluorination autoclave of the kind described in Example 1. There are no signs of any reaction during mixture of the components. 10 ml of antimony (V) chloride are then added, a moderate reaction beginning even at room temperature. After 1 hour, the autoclave is closed, heated to 140°C over a period of 3 hours, and kept at this temperature for another 2 hours. The hydrogen chloride relief pressure is reduced from an initial 25 t0 30 atms. to 20 atms. towards the end of the reaction. After cooling and venting, the product is worked up in the usual way by distillation.

First runnings with a b.p. of 90° to 110°C/10 Torr, $n_D^{20}$: 1.4630, are obtained in a quantity of 65 g, consisting of a mixture of differently fluorinated nitriles still containing up to 2 chlorine atoms in the side chain.

Fractional redistillation of the main runnings at normal pressure then gives 2,4-bis-(trifluromethyl)-benzonitrile of b.p. 188° – 192°C/760 Torr, $n_D^{20}$: 1.4208, and 2-difluorochloromethyl-4-trifluoromethyl benzonitrile of b.p. 218° – 221°C/760 Torr, $n_D^{20}$: 1,4578. The main fraction of 303 g of 2,4-bis-(difluorochloromethyl)-benzonitrile boils at b.p. 120°C/10 Torr, $n_D^{20}$: 1.4841.

b. 310 g of 2,4-bis-(difluorochloromethyl)-benzonitrile and 165 g of antimony (III) fluoride are introduced into a three-necked flask equipped with a stirring mechanism, reflux condenser and gas inlet pipe, and stirred while chlorine is slowly introduced. The reaction, which is only weakly exothermic at first becomes distinctly more vigorous above about 50°C, and the temperature rises in the absence of heat to 140°C. This temperature is maintained for 30 minutes by afterheating. The mixture is cooled, the inorganic fractions are removed by washing with dilute hydrochloric acid and the organic phase is dissolved in methylene chloride, followed by distillation after drying over sodium sulphate.

2,4-bis-(trifluoromethyl)-benzonitrile of b.p. 189° – 191°C. is obtained in a yield of 177 g, purity according to gas chromatography: 96.8%.

The 2,4-bis-(trichloromethyl)-benzonitrile used for the process was obtained as follows:

245 g of 2,4-dimethyl benzonitrile are initially introduced into a chlorination apparatus and gaseous chlorine introduced under ultraviolet irradiation at 50° to 195°C at a rate commensurate with the absorption of chlorine.

When no more chlorine is absorbed, the mixture is distilled. After some first runnings, 2,4-bis-(trichloromethyl)-benzonitrile of b.p. 175°C/3 Torr, m.p. 76° – 78°C, is obtained in a yield of 520 g.

500 g of 2,4-bis-(trichloromethyl)-benzonitrile are chlorinated at a temperature rising slowly from 200° to 270°C. After a coarse distillation, 358 g of distillate are obtained. According to a gas chromatogram, the liquid has a composition of 76% of 2-chloro-4-trichloromethyl benzonitrile, 13% of 2,4-dichlorobenzonitrile and 5% of unchanged starting material.

The 2-chloro-4-trichloromethyl benzonitrile can readily be isolated from the crude product by fractional distillation: b.p. 173° – 176°C/14 Torr, m.p. 68° – 70°C.

The other starting compounds used for the process according to the invention can be obtained in a similar way.

EXAMPLE 6

The following compounds can also be obtained in accordance with Examples 1 to 5:

| | b.p.°C/Torr | m.p.°C | $n_D^{20}$ | physical data of the corresponding chlorine compound |
|---|---|---|---|---|
|  | 78–79/15 | — | 1.4559 | 110–114°/0.05 m.p. 32°C |

— Continued

| | b.p.°C/Torr | m.p.°C | $n_D^{20}$ | physical data of the corresponding chlorine compound |
|---|---|---|---|---|
| (3-CF₂Cl, CN) | 98/11 | — | 1.4956 | see above |
| (CF₂Cl, CN, CF₂Cl) | 120/13 | — | 1.4814 | see Example 4: b.p.195–200°C/12 m.p.112–113°C |
| (CF₃, CN, CF₂Cl) | 219–221/760 | — | 1.4535 | see Example: b.p.195–200°/12 m.p.112–113°C |
| (CF₃, CN, CF₃) | 81–83/13 | — | 1.4212 | see Example 4: b.p.195–200°C/12 m.p.112–113°C |
| (ClF₂C, CN, CF₂Cl) | 136–137/12 | 42–43° | | m.p.218–220°C |
| (CF₃, CN, CF₃) | 102–104/14 | 58° | | " |

What we claim is:

1. Compound having the formula:

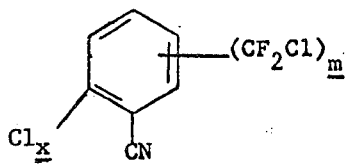

wherein
 x is 0 or 1, and
 m is 1 or 2.

2. Compound of claim 1 selected from the group of

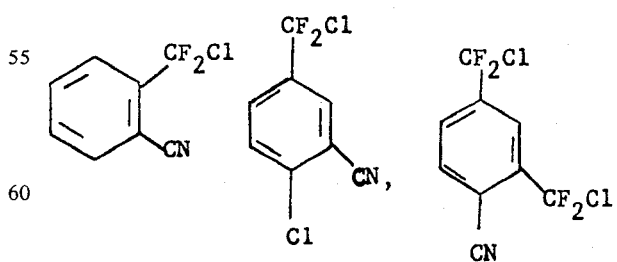

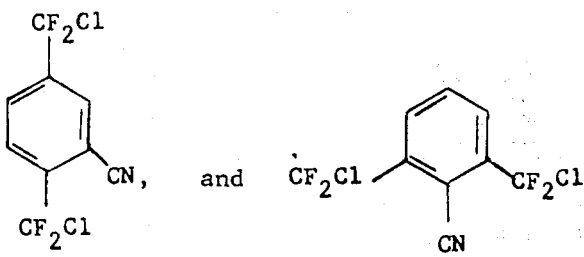

3. 2-difluorochloromethyl-5-trifluoromethyl-benzonitrile.

4. Process for preparing a benzonitrile with a fluorinated side chain which comprises reacting in a first step one or more compounds having the formula:

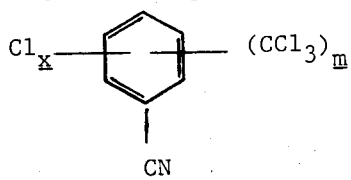

wherein
$m$ is 1 or 2, and
$x$ is 0 or 1, with anhydrous hydrofluoric acid at a temperature in the range of $-10°$ to $200°C$, optionally in the presence of antimony (V) chloride as a catalyst, to an intermediate partially fluorinated in the side chain and then fluorinating said intermediate with at least the stoichiometrically necessary quantity of antimony (III) fluoride at a temperature of up to $200°C$ to produce a benzonitrile perfluorinated in the side chain.

5. Process of claim 4 wherein the compound partially fluorinated in the side chain which is formed during the reaction is perfluorinated at a temperature in the range $60°$ to $180°C$.

6. Process of claim 4 wherein the reaction is carried out in the presence of an alkali metal fluoride.

* * * * *